United States Patent
Siegel et al.

(10) Patent No.: US 6,267,457 B1
(45) Date of Patent: Jul. 31, 2001

(54) HYDRAULIC UNIT FOR A SLIP-CONTROLLED MOTOR VEHICLE BRAKE SYSTEM

(75) Inventors: Heinz Siegel; Carsten Pabst, both of Stuttgart; Johann Guggemos, Blaichach; Norbert Schnurr, Rielasingen-Worblingen; Peter Eberspaecher, Neuhausen/Fildern; Roland Benzinger, Stuttgart; Michael Hellebrandt, Burgberg, all of (DE); Shawn Sullivan, Summerville, SC (US); Andreas Weh, Durach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/051,067
(22) PCT Filed: Sep. 3, 1996
(86) PCT No.: PCT/DE96/01632
§ 371 Date: Jul. 27, 1998
§ 102(e) Date: Jul. 27, 1998
(87) PCT Pub. No.: WO97/12790
PCT Pub. Date: Apr. 10, 1997

(30) Foreign Application Priority Data
Oct. 2, 1995 (DE) .............................. 195 36 847

(51) Int. Cl.⁷ ...................................................... B60T 8/40
(52) U.S. Cl. .......................................... 303/116.4; 303/87
(58) Field of Search .............................. 303/87, DIG. 10, 303/DIG. 11, 116.4; 138/26, 27, 28, 29, 40, 41, 42, 43, 44, 45, 46

(56) References Cited

U.S. PATENT DOCUMENTS

| | | | |
|---|---|---|---|
| 5,096,400 | * 3/1992 | Budecker et al. | 417/540 |
| 5,577,813 | * 11/1996 | Zaviska | 303/119.2 |
| 5,620,028 | * 4/1997 | Johnston et al. | 303/116.4 |
| 5,673,978 | * 10/1997 | Linkner, Jr. | 303/87 |
| 5,967,623 | * 10/1999 | Agnew | 303/87 |

* cited by examiner

Primary Examiner—Robert J. Oberleitner
Assistant Examiner—Robert A. Siconolfi
(74) Attorney, Agent, or Firm—Ronald E. Greigg; Edwin E. Greigg

(57) ABSTRACT

A damper unit in which a structural volume of the unit is reduced. The hydraulic unit includes a damper chamber formed by a stepped bore. A diameter-to-length ratio of the chamber is between 1:3 and 1:12. A closure element of the damper chamber is received with radial pressure in the bore and is retained on the discharge end by an embossed connection. The smaller-diameter portion of the damper chamber bore, when the hydraulic unit is in the position for use, is offset eccentrically upward from the larger-diameter bore portion with an at least approximately horizontally extending bore axis, so that the jackets of both bore portion merge at least approximately in alignment with one another at at least one point. The damper chamber is of slender design and intended to be disposed in a housing block of the hydraulic unit in a way that economizes on installation space and is intended to be simple to vent. The hydraulic unit is intended for use in slip-controlled motor vehicle brake systems.

2 Claims, 2 Drawing Sheets

HYDRAULIC UNIT FOR A SLIP-CONTROLLED MOTOR VEHICLE BRAKE SYSTEM

PRIOR ART

The invention is based on a hydraulic unit as set forth hereinafter.

One such unit is already known from International Patent Disclosure WO 94/08830, in which the damper chamber has a length of approximately twice its diameter, and part of it is continued in a recess of a closure element. A damper chamber embodied in this way is simple to make by metal-cutting machining in the housing block. Since a suitably large chamber volume is necessary if the damper chamber is to have a sufficiently calming effect on the pulsatingly fed volumetric flow of the pump, the diameter of the bore must be correspondingly large, at the indicated ratio to the length. However, this requires a correspondingly large installation space in the housing block of the hydraulic unit, which goes counter to the demand for minimizing the structural volume and saving weight. The severe stress on the closure element from the pump pressure, which results from the dimensions of the damper chamber, requires a screw fastening of the closure element, with a suitable thread length. Moreover, a cylindrical portion of the closure screw with a sealing ring placed in it is necessary, so as to seal off the damper chamber from the outside. This makes the unit more expensive to produce and can lead to errors in assembly.

ADVANTAGES OF THE INVENTION

The hydraulic unit according to the invention has the advantage over the prior art that because of the diameter-to-length ratio, the damper chamber can be disposed in a space-saving way in the direction crosswise to its longitudinal axis. In the damper chamber of the invention, which is smaller in diameter compared with the known embodiment, for the same volumes, the stress on the closure element is less despite identical pressure conditions, so that a rational type of fastening can be made use of, and a special seal can be dispensed with.

The device can be shaped from sheet metal at deep-drawn parts, and because of the shape of the bottom can withstand sufficiently severe stress; the closure element set forth herein also contributes to the effective volume of the damper chamber.

This is also the case in which the closure element can be embodied as a heavy-duty part made by impact extrusion.

BRIEF DESCRIPTION OF THE DRAWINGS

An exemplary embodiment of the invention is shown in simplified form in the drawings and described in further detail in the ensuing description.

DESCRIPTION OF THE EXEMPLARY EMBODIMENT

Figure 1:
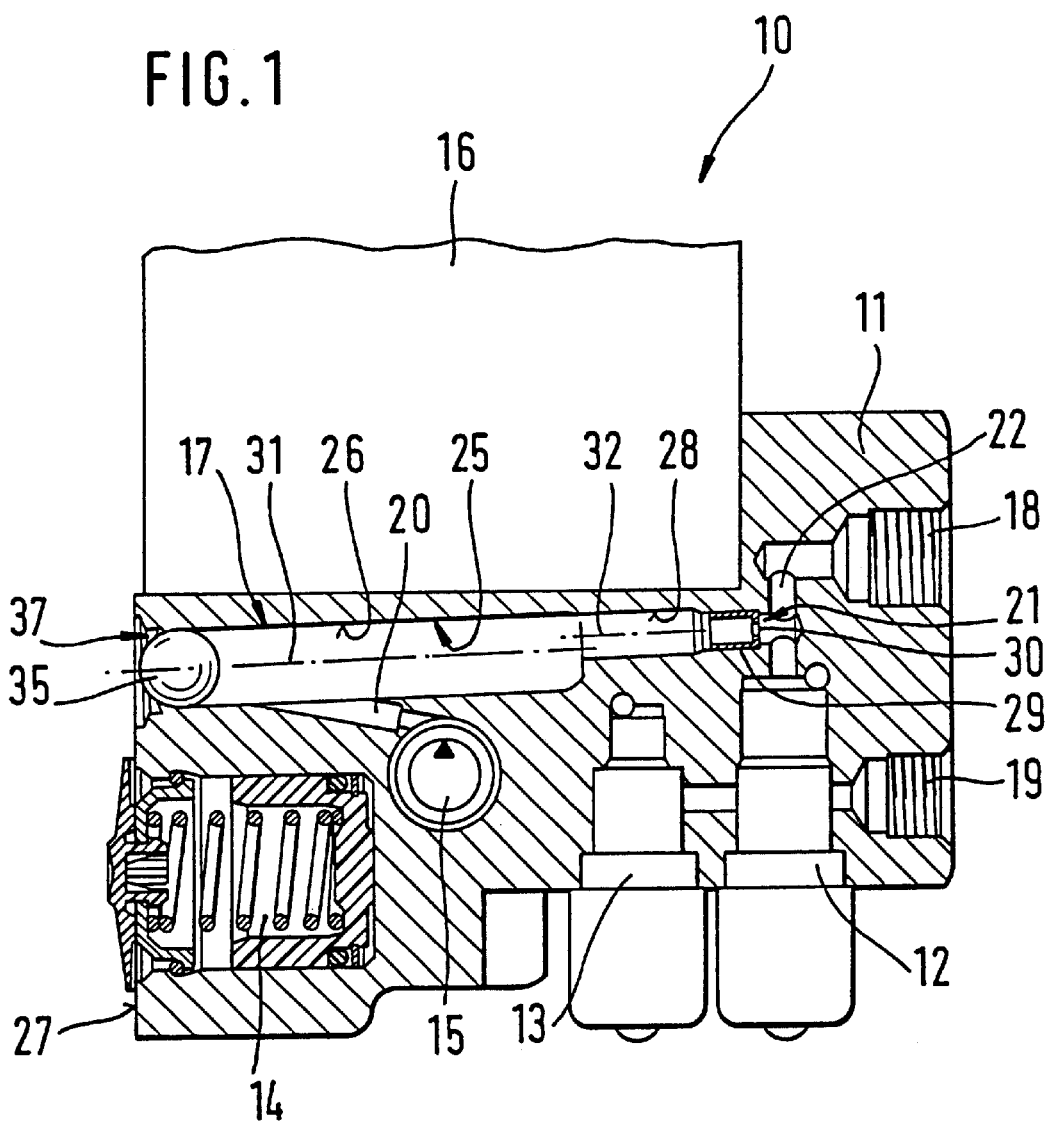
FIG. 1 shows a hydraulic unit in section for a slip-controlled motor vehicle brake system, with a damper chamber closed by a closure element.

A hydraulic unit 10, shown in section in FIG. 1, of a slip-controlled motor vehicle brake system has a housing block 11, in which elements of the brake system are received. Of these elements, those visible in the sectional plane are as follows:

Two valves 12 and 13, a storage chamber 14 for pressure fluid, a high-pressure pump 15, indicated by a symbol and drivable by means of an electric drive motor 16, and a damper chamber 17. Also visible are two connection bores 18 and 19 for the connection of lines, not shown; the upper connection bore 18 communicates with a master cylinder, and the lower connection bore 19 communicates with a wheel brake cylinder of the brake system.

The damper chamber 17 serves to smooth the volumetric flow of pressure fluid, which is fed by the pulsatingly feeding high-pressure pump 15, in an anti-lock control mode, through a line 20 into the damper chamber 17, from which the pressure fluid, after overcoming a throttle restriction 21, passes through an outlet line 22 and the connection bore 18 to reach the master cylinder. A circuit diagram and a description of the function of a slip-controlled motor vehicle brake system, in which the mode of operation of the damper chamber 17 is employed, is shown and described for instance in German Patent Disclosure DE 41 19 662 A1.

The damper chamber 17 is formed by a stepped bore 25 of the housing block 11. The bore 25 begins, with a larger-diameter portion 26, at a side face 27 of the housing block 11. The larger-diameter portion 26 is adjoined by a smaller-diameter portion 28. This latter portion is stepped down in diameter at the end, where it has a sleeve 29, inserted by press-fitting, with a bore 30 toward its bottom, the bore forming the aforementioned throttle restriction 21. In the illustrated position for use of the hydraulic unit 10, the course of the stepped bore 25 deviates slightly from the horizontal; that is, the bore axes 31 and 32 of the two bore portions slope upward toward the right, beginning at the side face 27 of the housing block 11. In addition, from the course of the two bore axes 31 and 32, one can see that the bore portions 26 and 28 are not aligned. The smaller-diameter portion 28 is in fact eccentrically offset upward relative to the larger-diameter portion 26, so that the jackets of the two bore portions merge virtually in alignment with one another at at least one point.

Figure 2:
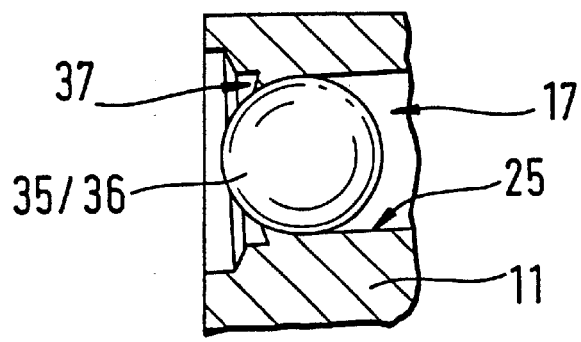
FIGS. 2–6 shows embodiments of closure elements, on a larger scale than in FIG. 1.

In the region of its orifice into the side face 27, the damper chamber 17 is sealed tightly off from the outside by a closure element 35. As the first embodiment of the closure element, a ball 36 is provided (FIG. 2). It is received with radial pressure in the bore portion 26 and is retained on the side toward the orifice by an embossed connection 37. The embossed connection 37 is achieved by positive displacement of housing material, which form-lockingly embraces the ball 36 in a closed circle. The closure element 35, thus secured, not only reliably seals off the damper chamber 17 from the escape of pressure fluid to the outside but is also capable of securely holding the ball 36 in its press-fitted seat counter to forces originating in the pump pressure.

The larger-diameter bore portion 26, which substantially determines the volume of the damper chamber 17 for receiving pressure fluid, has a diameter-to-length ratio of about 1:5. The smaller-diameter bore portion 28 contributes only approximately an additional one-fifth to the aforementioned volume of the bore portion 26. Because of the dimensions, particularly of the bore portion 26, the damper chamber 17 is relatively slender in shape. It therefore requires relatively little installation space in the vertical direction in the housing block 11. Because of this shape of the damper chamber 17, the housing block 11 of the hydraulic unit 10 can be embodied as relatively narrow in the vertical direction. This advantage of economy of space is attainable, compared with the prior art referred to at the outset, if the diameter-to-length ratio of the damper chamber bore is between 1:3 and 1:12.

The line 20 leading away from the high-pressure pump 15 discharges into the larger-diameter portion 26 of the damper chamber bore 25 at the bottom. The line 20 extends at an acute angle to the bore axis 21 in the direction toward the closure element 35. Pressure fluid pumped by the high-pressure pump 15 accordingly penetrates the damper chamber 17 at the bottom, then largely reverses its flow direction and flows from the larger-diameter portion 26 into the smaller-diameter portion 28, which is located at a higher lever and which the pressure fluid leaves through the outlet line 22, after overcoming the throttle restriction 21. This flow configuration promotes venting of the damper chamber 17 the first time the hydraulic unit 10 is filled with pressure fluid. This fluid fills the damper chamber 17 from the bottom up and positively displaces the gas, present in the damper chamber, to the outlet line 22. Gas bubbles adhering in the direction of the closure element 35 are engaged by the pressure fluid flow of the high-pressure pump 15 and flushed through the damper chamber 17 to the outlet line 22. If in a departure from the position of use shown the hydraulic unit 10 assumes a position of use that is rotated approximately 90° counterclockwise, then the good ventability of the damper chamber 17 is preserved or even improved.

Figure 3:
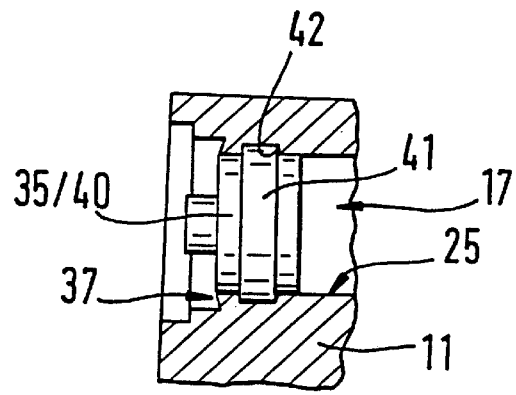

Instead of the ball 36, other closure elements 35 for the damper chamber 17 can also be used:

For instance, as the closure element 35, FIG. 3 shows a cylindrical plug 40, which circumferentially has a collar 41, with which the plug is braced against a stop face 42 of the damper chamber bore 25. The aforementioned embossed connection 37 fits encompassingly over the collar 41, received with a press fit in the bore 25, on the end toward the orifice.

Figure 4:
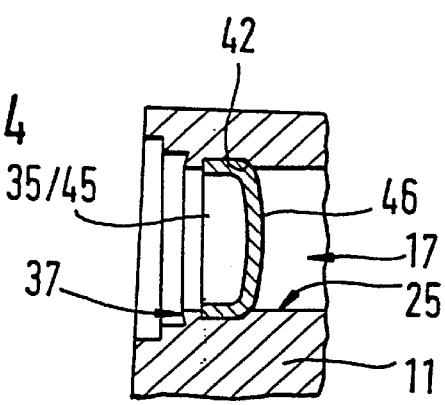

In the embodiment of the closure element 35 of FIG. 4, a sleeve 45 is used, which is deep-drawn from sheet metal and has a bottom 46 that is convex on the side toward the damper chamber. The sleeve 45 is circumferentially received with a press fit in the bore 25, and on the side toward the orifice the embossed connection 37 fits over it. Despite an only slight sheet-metal thickness, the bottom 46, because of its shaping, can withstand the forces acting on it on the side toward the damper chamber.

Figure 5:
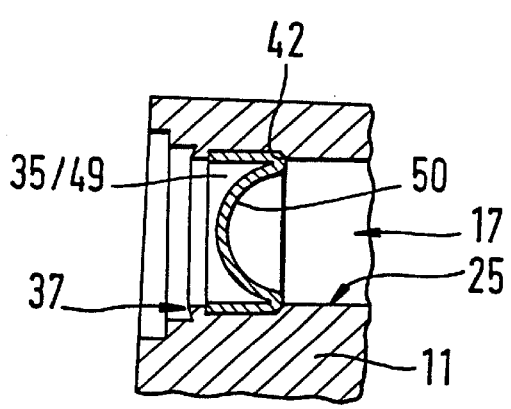

The embodiment of a closure element shown in FIG. 5 again has a sleeve 49 made as a deep-drawn sheet-metal part, with a bottom 50 that is concave toward the damper chamber or in other words is embodied as a hollow hemisphere. The volume located inside the bottom 50 contributes to the volume of the damper chamber 17. The sleeve 49 is secured in the damper chamber bore 25 in the same way as in the embodiment of FIG. 4.

Figure 6:
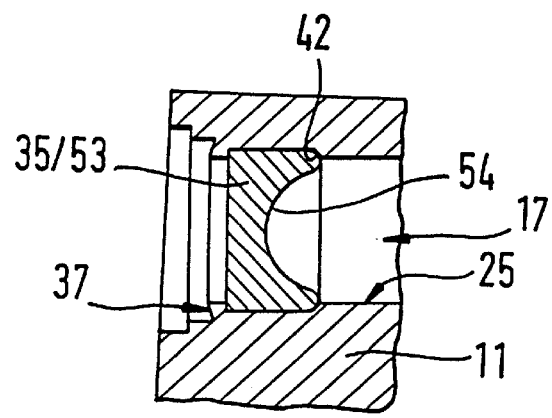

FIG. 6 shows an embodiment for the closure element 35 in the form of a cylindrical plug 53 embodied as an impact extruded part. As in the embodiment of FIG. 5, it has a recess 54 that is concave toward the damper chamber. This recess likewise contributes to the damper chamber volume. The cylindrical plug 53 is seated with a press fit in the damper chamber bore 25 and on the side toward the orifice is held by means of the embossed connection 35.

The foregoing relates to preferred exemplary embodiments of the invention, it being understood that other variants and embodiments thereof are possible within the spirit and scope of the invention, the latter being defined by the appended claims.

What is claimed is:

1. A hydraulic unit (10) for a slip-controlled vehicle brake system, comprising:

a high pressure pump (15), a damper chamber (17), said damper chamber communicates on an inlet side with said high-pressure pump (15) which pumps a liquid into said damper chamber, and on an outlet side with an outlet line (22); the damper chamber (17) is disposed in a housing block (11) of the hydraulic unit (10) in which a first valve (12), a second valve (13), and a storage chamber (14) of the brake system are also received; the damper chamber (17) is formed by a stepped bore (25) which begins at an outer face (27) of the housing block (11) and is closed off from an outside by a fixed closure element (35); a diameter-to-length ratio of the damper chamber bore (25) is between 1:3 and 1:12; and the closure element (35) of the damper chamber (17) is a ball which is received with radial pressure in a bore (25) and is retained on a discharge end of said high pressure pump by an embossed connection (37).

2. A hydraulic unit (10) for a slip-controlled vehicle brake system, comprising:

a high pressure pump (15), a damper chamber (17), said damper chamber communicates on an inlet side with said high-pressure pump (15), and on an outlet side with an outlet line (22);

the damper chamber (17) is disposed in a housing block (11) of the hydraulic unit (10) in which a first valve (12), a second valve (13), and a storage chamber (14) of the brake system are also received;

the damper chamber (17) is formed by a stepped bore (25) which begins at an outer face (27) of the housing block (11) and is closed off from an outside by a fixed closure element (35);

a diameter-to-length ratio of the damper chamber bore (25) is between 1:3 and 1:12; and the closure element (35) of the damper chamber (17) is a sleeve (45), with a bottom (46) that is convex toward the damper chamber, which is received with radial pressure in a bore (25) and is retained on a discharge end of said high pressure pump by an embossed connection (37).

* * * * *